UNITED STATES PATENT OFFICE 2,097,194

FLUX FOR GALVANIZING

Raymond J. Kepfer, Lakewood, Ohio, assignor, by mesne assignments, to E. I. du Pont de Nemours & Company, Wilmington, Del., a corporation of Delaware No Drawing. Application November 14, 1934, Serial No. 752,943

6 Claims. (Cl. 91—70.2)

This invention relates to flux compositions and processes for hot dip galvanizing, and is particularly directed to prepared flux compositions and to processes wherein a protein, or protein containing material, is used as a foaming agent.

In hot dip galvanizing, a bath of molten zinc is covered with a flux. As articles to be galvanized are lowered into the molten zinc bath, they, of course, first pass through the flux where they are cleaned and prepared for the reception of a metal coating.

It has heretofore been the practice to add a material such as glycerine or tallow to the flux on the molten bath, in order to produce a foam or froth. This foam serves to entrap vapors and gases, and to retard the rate of volatilization of the flux. In the course of a galvanizing operation, it has been necessary to replace such of the flux as has volatilized, and it has also been necessary to add foam producing material to maintain a foam blanket of the desired thickness and character.

A considerable loss of flux and of foam producing agent resulted from the fact that they were added separately, and at the judgment of the galvanizer. At times there was not enough of the foaming agent present to maintain a foam of proper consistency and thickness, with the result that an excessive amount of flux was lost by volatilization. At other times, and especially immediately following its addition, there was present an excess of poorly mixed foaming material, with the result that some of it was decomposed and charred by the high temperatures of the galvanizing pot. In addition to thus wasting foaming agent, this decomposition and charring resulted in the formation of charred particles which interfere with the galvanizing operation.

It is an object of this invention to provide processes and compositions whereby an optimum foam thickness and consistency are easily maintained, and whereby there is a minimum loss of flux and foaming agent. A further object of my invention is to provide a prepared composition which may be conveniently and easily used. Other objects will appear hereinafter.

I accomplish my objects by mixing together the proper amounts of a flux and a protein containing material. A galvanizer is thus enabled to add the flux and foaming agent conveniently and in the proportions required to obtain a desired height and consistency of foam. As a result, there is no excessive loss of flux by volatilization. Also, since the flux and foaming agent are intimately mixed and in proper proportions, there is no charring of foaming agent.

The compositions of my invention are composed of a protein and a chloride flux selected from the group consisting of zinc chloride, ammonium chloride, and zinc ammonium chloride. The protein is added as a protein containing material, as it is unnecessary and impractical to use a pure protein.

While I may use any protein, I prefer to employ a protein material from the group consisting of cotton-seed meal, gelatine, glue, albumen, diastofor, and and milk powder. Generally, I prefer to use a protein material of animal origin as such materials are particularly efficient and are well adapted to my purposes. One protein material of vegetable origin, cotton-seed meal, is quite efficient as a foaming agent, and, by reason of its low cost and its stability when stored with a flux, it is one of my preferred materials.

While I usually employ from about one to five per cent of a protein material, the amount may be widely varied according to the conditions of use and according to the amount and type of impurities which the protein material contains. When the composition is to be used in a basket-process, or in a process of similar type, it is desirable to maintain a thick, heavy foam. Compositions to be used with such processes should contain about three per cent, or more, of a protein material.

However, in the so-called hook process in which articles are suspended from hooks when lowered into the bath, it is necessary to use a somewhat lighter and thinner foam as otherwise the articles will not penetrate the foam, but will float off the hooks and become detached. For this type of process the flux composition preferably contains from about one to three per cent of protein material.

As typical examples of compositions according to my invention, I may give the following:

*Example 1.*—A prepared flux particularly adapted for use in a basket-type galvanizing process was prepared by intimately mixing three per cent of cotton-seed meal with a zinc ammonium chloride flux (44% $ZnCl_2$ and 56% $NH_4Cl$). This composition was used by adding some of it directly to a galvanizing pot containing molten zinc. An excellent foam blanket which lasted about thirty-six minutes and which was about five inches thick was obtained. It was easily maintained by adding more of the composition as needed.

*Example 2.*—A similar flux composition was prepared using five per cent of cotton-seed meal. A foam seven inches thick which lasted about thirty-nine minutes was obtained.

*Example 3.*—A flux composition particularly adapted for use in a hook-type galvanizing process was prepared by intimately mixing one and one-half per cent of cotton-seed meal with a zinc ammonium chloride flux. With this prepared composition, a foam about three and one-half inches thick was obtained. The foam lasted about thirty minutes, and it was then necessary to add more of the prepared composition to maintain the foam. The foam was of a relatively thin consistency, and when articles suspended from hooks were lowered into the bath, they penetrated the foam without floating off the hooks.

*Example 4.*—A composition similar to that of Example 3 was prepared using two per cent of cotton-seed meal. A foam which lasted about thirty-five minutes and which was about four inches thick was obtained.

*Example 5.*—A prepared flux composition was made by mixing two per cent of gelatine with a zinc ammonium chloride flux. Using this composition in a galvanizing pot, there was obtained a foam eight inches thick which lasted over twenty minutes.

Example 6.—A similar composition using one per cent of bone glue produced a foam five inches thick which lasted about twenty minutes.

The gelatine of Example 5 is, of course, very similar in its action to the glue of Example 6 since gelatine is a refined form of animal glue. When I refer to animal glue hereinafter, it will be understood that the product may be of any degree of purity.

In addition to the agents above listed, albumen, diastofor (a malt extract), and milk powder may be mentioned as examples of protein materials which I have found satisfactory for the purposes of my invention.

The protein materials above noted contain some substances other than proteins. The foreign substances make it necessary to add a larger weight of material, but they do not seriously interfere with the operation of the materials as foaming agents, and there is no particular need to remove them. If desired, of course, the proteins may be purified by removing some, or all, of the foreign materials.

The foaming agents may be mixed with the flux in any desired manner. For instance, the foaming agent in finely divided form may be tumbled or ground with the flux.

While the invention, as above described, is particularly adapted to hot dip galvanizing, it may be applied to other hot dip processes. It may, for instance, be applied to processes of hot dip coating which use molten baths of tin, lead, or cadmium.

While I have disclosed certain specific compositions and processes, they are merely illustrative and I do not intend to be limited thereby, the scope of my invention appearing from the following claims:

I claim:

1. As a new article of manufacture, a foaming galvanizing flux composition for use on a galvanizing bath of molten metal, comprising a predetermined amount of a protein material of animal origin and a chloride flux selected from the group consisting of zinc chloride, ammonium chloride, and zinc ammonium chloride.

2. As a new article of manufacture, a foaming galvanizing flux composition for use on a galvanizing bath of molten metal, comprising a predetermined amount of animal glue and a chloride flux selected from the group consisting of zinc chloride, ammonium chloride, and zinc ammonium chloride.

3. As a new article of manufacture, a foaming galvanizing flux composition for use on a galvanizing bath of molten metal comprising a predetermined amount of albumen and a chloride flux selected from the group consisting of zinc chloride, ammonium chloride, and zinc ammonium chloride.

4. In a process of hot dip galvanizing wherein articles to be coated are immersed in a bath of molten zinc, the steps comprising adding directly to the bath a foaming flux comprising a predetermined amount of a protein material of animal origin and a chloride flux selected from the group consisting of zinc chloride, ammonium chloride, and zinc ammonium chloride, and maintaining a desired foam character and thickness by directly adding more of the foaming flux as required.

5. In a process of hot dip galvanizing wherein articles to be coated are immersed in a bath of molten zinc, the steps comprising adding directly to the bath a foaming flux comprising a predetermined amount of animal glue and a chloride flux selected from the group consisting of zinc chloride, ammonium chloride, and zinc ammonium chloride, and maintaining a desired foam character and thickness by directly adding more of the foaming flux as required.

6. In a process of hot dip galvanizing wherein articles to be coated are immersed in a bath of molten zinc, the steps comprising adding directly to the bath a foaming flux comprising a predetermined amount of albumen and a chloride flux selected from the group consisting of zinc chloride, ammonium chloride, and zinc ammonium chloride, and maintaining a desired foam character and thickness by directly adding more of the foaming flux as required.

RAYMOND J. KEPFER.